(12) United States Patent
Ivanov et al.

(10) Patent No.: US 10,909,977 B2
(45) Date of Patent: Feb. 2, 2021

(54) APPARATUS AND METHOD FOR POWER EFFICIENT SIGNAL CONDITIONING FOR A VOICE RECOGNITION SYSTEM

(71) Applicant: Google Technology Holdings LLC, Mountain View, CA (US)

(72) Inventors: Plamen A. Ivanov, Schaumburg, IL (US); Kevin J. Bastyr, Milwaukee, WI (US); Joel A. Clark, Woodridge, IL (US); Mark A. Jasiuk, Chicago, IL (US); Tenkasi V. Ramabadran, Oswego, IL (US); Jincheng Wu, Naperville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/977,397

(22) Filed: May 11, 2018

(65) Prior Publication Data

US 2018/0268811 A1 Sep. 20, 2018

Related U.S. Application Data

(63) Continuation of application No. 13/955,186, filed on Jul. 31, 2013, now abandoned.
(Continued)

(51) Int. Cl.
*G10L 15/20* (2006.01)
*G10L 21/0364* (2013.01)
(Continued)

(52) U.S. Cl.
CPC .............. *G10L 15/20* (2013.01); *G10L 15/28* (2013.01); *G10L 21/0202* (2013.01);
(Continued)

(58) Field of Classification Search
CPC ....................................................... G10L 15/28
(Continued)

(56) References Cited

U.S. PATENT DOCUMENTS 4,630,304 A * 12/1986 Borth .................. G10K 11/178
381/94.3
5,737,695 A * 4/1998 Lagerqvist ............ G10L 19/012
331/110
(Continued)

OTHER PUBLICATIONS

Ayaz Keerio, et al, "On Preprocessing of Speech Signals", International Journal of Signal Processing 5:3, 2009, pp. 216-222.
(Continued)

*Primary Examiner* — Bhavesh M Mehta
*Assistant Examiner* — Timothy Nguyen
(74) *Attorney, Agent, or Firm* — Honigman LLP; Brett A. Krueger; Grant Griffith

(57) ABSTRACT

A disclosed method includes monitoring an audio signal energy level while having a plurality of signal processing components deactivated and activating at least one signal processing component in response to a detected change in the audio signal energy level. The method may include activating and running a voice activity detector on the audio signal in response to the detected change where the voice activity detector is the at least one signal processing component. The method may further include activating and running the noise suppressor only if a noise estimator determines that noise suppression is required. The method may activate and runs a noise type classifier to determine the noise type based on information received from the noise estimator and may select a noise suppressor algorithm, from a group of available noise suppressor algorithms, where the selected noise suppressor algorithm is the most power consumption efficient.

22 Claims, 4 Drawing Sheets

Related U.S. Application Data

(60) Provisional application No. 61/827,797, filed on May 28, 2013, provisional application No. 61/798,097, filed on Mar. 15, 2013, provisional application No. 61/776,793, filed on Mar. 12, 2013.

(51) Int. Cl.

| | | |
|---|---|---|
| *G10L 21/0216* | (2013.01) | |
| *G10L 15/28* | (2013.01) | |
| *G10L 21/02* | (2013.01) | |
| *G10L 25/21* | (2013.01) | |

(52) U.S. Cl.
CPC ...... *G10L 21/0364* (2013.01); *G10L 21/0216* (2013.01); *G10L 25/21* (2013.01); *G10L 2021/02161* (2013.01)

(58) Field of Classification Search
USPC .......................................................... 704/233
See application file for complete search history.

(56) References Cited

U.S. PATENT DOCUMENTS

| | | | |
|---|---|---|---|
| 5,983,186 A | 11/1999 | Miyazawa et al. | |
| 6,070,140 A | 5/2000 | Tran | |
| 6,757,367 B1* | 6/2004 | Nicol | H04B 3/23 379/100.01 |
| 6,968,064 B1* | 11/2005 | Ning | H04M 9/082 379/406.12 |
| 7,263,074 B2* | 8/2007 | LeBlanc | G10L 25/78 370/286 |
| 8,345,890 B2* | 1/2013 | Avendano | G10L 21/0208 381/94.3 |
| 8,566,086 B2* | 10/2013 | Giesbrecht | G10L 15/065 381/71.11 |
| 8,744,844 B2* | 6/2014 | Klein | G10L 21/0208 704/226 |
| 8,924,204 B2* | 12/2014 | Chen | G10L 21/0208 704/226 |
| 9,094,744 B1* | 7/2015 | Lu | H04R 3/005 |
| 2003/0023433 A1* | 1/2003 | Erell | H03G 3/32 704/233 |
| 2005/0060149 A1* | 3/2005 | Guduru | G10L 25/78 704/233 |
| 2005/0165604 A1* | 7/2005 | Hanazawa | G10L 15/05 704/201 |
| 2007/0021958 A1* | 1/2007 | Visser | G10L 21/0272 704/226 |
| 2008/0159560 A1* | 7/2008 | Song | G10L 25/78 381/94.1 |
| 2008/0201138 A1* | 8/2008 | Visser | G10L 21/0208 704/227 |
| 2008/0249779 A1* | 10/2008 | Hennecke | G10L 15/22 704/270 |
| 2009/0198492 A1* | 8/2009 | Rempel | G10L 15/20 704/233 |
| 2009/0290718 A1* | 11/2009 | Kahn | H03G 3/32 381/57 |
| 2010/0191525 A1* | 7/2010 | Rabenko | H04L 7/0029 704/211 |
| 2010/0198590 A1* | 8/2010 | Tackin | H04L 12/6418 704/214 |
| 2011/0106533 A1* | 5/2011 | Yu | G10L 25/78 704/233 |
| 2011/0184734 A1* | 7/2011 | Wang | G10L 25/78 704/233 |
| 2013/0035040 A1* | 2/2013 | Terlizzi | H04M 1/6058 455/63.1 |
| 2014/0163978 A1* | 6/2014 | Basye | G10L 15/28 704/233 |
| 2017/0053639 A1* | 2/2017 | Lu | G10K 11/178 |
| 2017/0162205 A1* | 6/2017 | Melvin | G10L 17/22 |

OTHER PUBLICATIONS

Cohen et al., "Minimizing Power Consumption in Micro-Processor Based Systems Which Utilize Speech Recognition Devices", IBM Technical Disclosure Bulletin, International Business Machines Corp. (Thornwood), US, vol. 37, No. 10, Oct. 1, 1994 (Oct. 1, 1994), pp. 151-153.

International Preliminary Report on Patentability in International Application No. PCT/US2014/014371, dated Sep. 24, 2015, 7 pages.

International Search Report and Written Opinion in International Application No. PCT/US2014/014371, dated May 6, 2014, 9 pages.

* cited by examiner

APPARATUS AND METHOD FOR POWER EFFICIENT SIGNAL CONDITIONING FOR A VOICE RECOGNITION SYSTEM

CROSS-REFERENCE TO RELATED APPLICATIONS

This patent application is a continuation (and claims the benefit of priority under 35 USC 120) of U.S. patent application Ser. No. 13/955,186, filed Jul. 31, 2013, which claims priority to U.S. Provisional Patent Application No. 61/827,797, filed May 28, 2013, entitled "APPARATUS AND METHOD FOR POWER EFFICIENT SIGNAL CONDITIONING IN A VOICE RECOGNITION SYSTEM," and further claims priority to U.S. Provisional Patent Application No. 61/798,097, filed Mar. 15, 2013, entitled "VOICE RECOGNITION FOR A MOBILE DEVICE," and further claims priority to U.S. Provisional Pat. App. No. 61/776,793, filed Mar. 12, 2013, entitled "VOICE RECOGNITION FOR A MOBILE DEVICE," all of which are assigned to the same assignee as the present application, and all of which are hereby incorporated by reference herein in their entirety.

FIELD OF THE DISCLOSURE

The present disclosure relates generally to voice signal processing and more particularly to voice signal processing for voice recognition systems.

BACKGROUND

Mobile devices such as, but not limited to, mobile phones, smart phones, personal digital assistants (PDAs), tablets, laptops or other electronic devices, etc., increasingly include voice recognition systems to provide hands free voice control of the devices. Although voice recognition technologies have been improving, accurate voice recognition remains a technical challenge.

A particular challenge when implementing voice recognition systems on mobile devices is that, as the mobile device moves or is positioned in certain ways, the acoustic environment of the mobile device changes accordingly thereby changing the sound perceived by the mobile device's voice recognition system. Voice sound that may be recognized by the voice recognition system under one acoustic environment may be unrecognizable under certain changed conditions due to mobile device motion or positioning. Various other conditions in the surrounding environment can add noise, echo or cause other acoustically undesirable conditions that also adversely impact the voice recognition system.

More specifically, the mobile device acoustic environment impacts the operation of signal processing components such as microphone arrays, noise suppressors, echo cancellation systems and signal conditioning that is used to improve voice recognition performance. Such signal processing operations for voice recognition improvement are not power efficient and increase the drain on battery power. Because users expects voice recognition systems to be available as needed, various voice recognition system programs, processes or services may be required to run continuously resulting in further increased power consumption.

DETAILED DESCRIPTION

Figure 1:
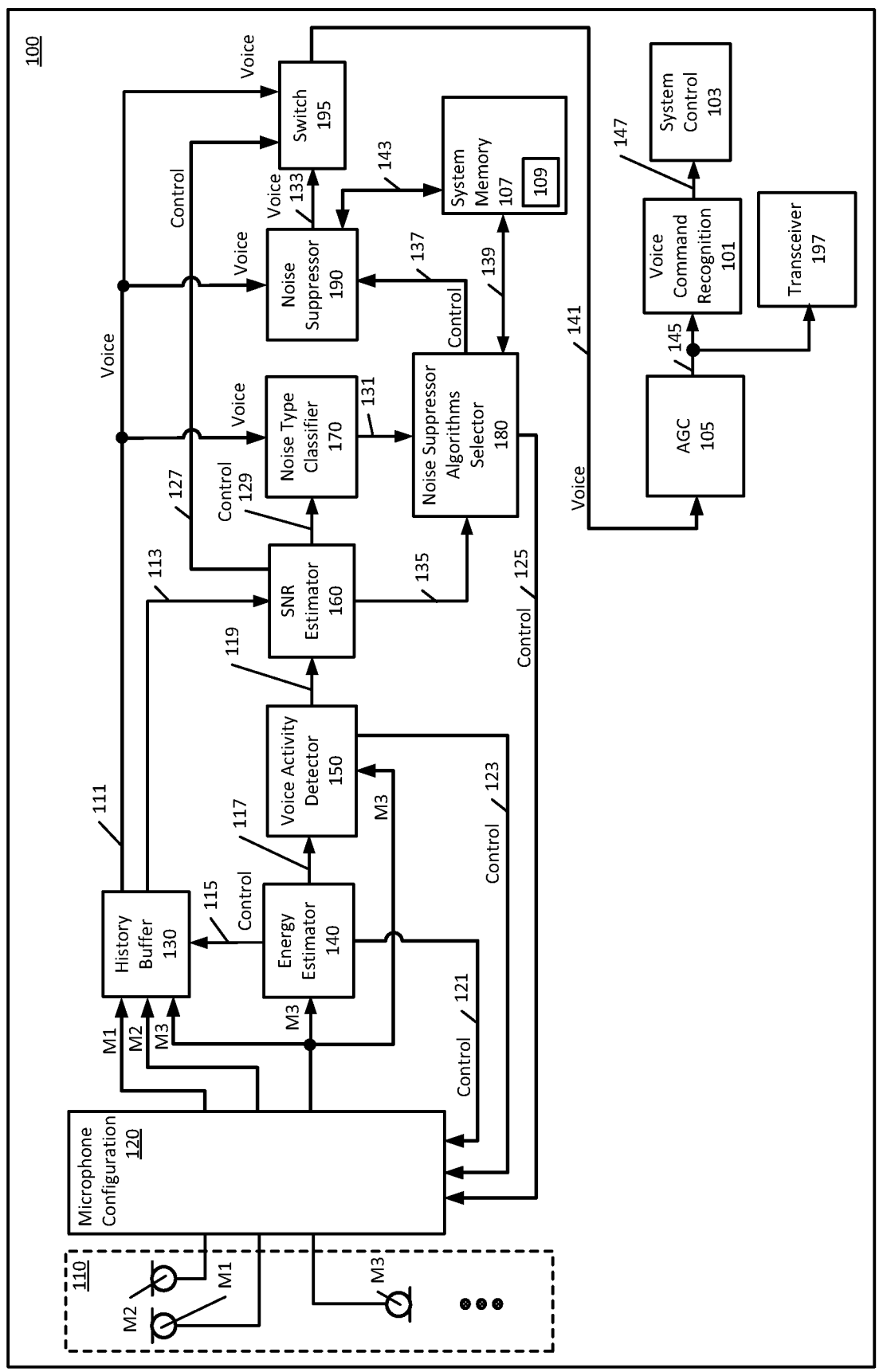
FIG. 1 is a schematic block diagram of an apparatus in accordance with the embodiments.

Briefly, the disclosed embodiments detect when conditions require the use of accurate, and thus less power efficient, signal processing to assist in voice recognition. Such power intensive signal processing is turned off or otherwise disabled to conserve battery power for as long as possible. The disclosed embodiments achieve a progressive increase of accuracy by running more computationally efficient signal processing on fewer resources and making determinations of when to invoke more sophisticated signal processing based on detected changes of conditions. More particularly, based on information obtained from signal observations, decisions may be made to power-off hardware that is not needed. In other words, when conditions improve from the standpoint of voice recognition performance, the amount of signal processing is ramped down which results in more efficient use of resources and decreased battery power consumption.

Among other advantages of the disclosed embodiments, power consumption is minimized by optimizing voice recognition system operation in every software and hardware layer, including switching off non-essential hardware, running power efficient signal processing and relying on accurate, less power efficient signal processing only when needed to accommodate acoustic environment conditions.

A disclosed method of operation includes monitoring an audio signal energy level with a plurality of signal processing components deactivated, and activating at least one signal processing component of the plurality of signal processing components in response to a detected change in the audio signal energy level. The method may further include activating and running a voice activity detector on the audio signal in response to the detected change in the audio energy level where the voice activity detector is one of the signal processing components that is otherwise kept deactivated. In one embodiment, a method of operation includes monitoring an audio signal energy level while having a noise suppressor deactivated to conserve battery power, buffering the audio signal in response to a detected change or increase in the audio energy level, activating and running a voice activity detector on the audio signal in response to the detected change or increase in the audio energy level and activating and running a noise estimator in response to voice being detected in the audio signal by the voice activity detector. In some embodiments, the method may further include activating and running the noise suppressor only if the noise estimator determines that noise suppression is required. In some embodiments, the method may further include activating and running a noise type classifier to determine the noise type based on information received from the noise estimator and selecting a noise suppressor algorithm, from a group of available noise suppressor algorithms, based on the noise type. The selected noise suppressor algorithm may also be selected based on power consumption efficiency for the noise type. The method may further include determining, by the noise estimator, that noise suppression is not required, and performing voice recognition on the buffered audio signal without activating the noise suppressor.

The method may also include applying gain to the buffered audio signal prior to performing voice recognition. The method may include activating additional microphones to receive audio in response to the detected increase in the audio energy level. The method of operation may deactivate the additional microphones and return to a single microphone configuration in response to voice not being detected in the audio signal by the voice activity detector. The energy estimator calculates a long term energy baseline and a short term deviation from it, and monitors the audio signal energy level while having a noise suppressor, or other signal processing components, deactivated to conserve battery power. The method of operation may include buffering the audio signal in response to a detected short term deviation.

A disclosed apparatus in one embodiment includes a noise suppressor, a voice activity detector and an energy estimator that is operatively coupled to the voice activity detector. The energy estimator is operative to monitor an audio signal energy level with at least the noise suppressor and the voice activity detector deactivated. Upon detecting a change in the audio signal energy level, the voice activity detector is operative to activate at least the voice activity detector in response to the detected change. In one embodiment, a disclosed apparatus includes voice recognition logic, a noise suppressor operatively coupled to the voice recognition logic, an energy estimator operative to monitor an audio signal energy level while the noise suppressor is deactivated to conserve battery power, and a voice activity detector operatively coupled to the energy estimator. The voice activity detector is operative to activate in response to a first activation control signal from the energy estimator. A noise estimator is operatively coupled to the voice activity detector. The noise estimator is operative to activate in response to a second activation control signal from the voice activity detector.

In various embodiments, the apparatus may include a buffer that is operatively coupled to the voice recognition logic and the energy estimator. The buffer is operative to receive a control signal from the energy estimator and to buffer the audio signal in response to the control signal. The energy estimator may be further operative to send the first activation control signal to the voice activity detector in response to a detected change or increase in the audio signal energy level. The voice activity detector is operative to send the second activation control signal to the noise estimator in response to detecting voice in the audio signal.

In various embodiments, the apparatus may include a switch that is operatively coupled to the voice recognition logic, the noise suppressor and the noise estimator. The noise estimator may actuate the switch to switch the audio signal sent to the voice recognition logic from a buffered audio signal to a noise suppressed audio signal output by the noise suppressor. The apparatus may further include a noise suppressor algorithms selector, operatively coupled to the noise estimator and to the noise suppressor. The noise suppressor algorithms selector operative to activate and run the noise suppressor in response to a noise estimator control signal sent when the noise estimator determines that noise suppression is required.

In some embodiments, the apparatus may further include a noise type classifier, operatively coupled to the noise estimator and to the noise suppressor algorithms selector. The noise type classifier is operative to activate and run in response to a control signal from then noise estimator, and is operative to determine noise type based on information received from the noise estimator. The noise suppressor algorithms selector may be further operative to select a noise suppressor algorithm, from a group of available noise suppressor algorithms, where the selected noise suppressor algorithm is the most power consumption efficient for the noise type. The noise estimator may also be operative to determine that noise suppression is not required and actuate the switch to switch the audio signal sent to the voice recognition logic from a noise suppressed audio signal output by the noise suppressor to a buffered audio signal.

In some embodiments, the apparatus includes a plurality of microphones and microphone configuration logic that includes, among other things, switch logic operative to turn each microphone on or off. The energy estimator is further operative to control the microphone configuration logic to turn on additional microphones in response to a detected change or increase in the audio signal energy level. The voice activity detector may be further operative to deactivate the additional microphones and return to a single microphone configuration, or to a low power mode of that microphone, in response to voice not being detected in the audio signal by the voice activity detector.

Turning now to the drawings, FIG. 1 is a schematic block diagram of an apparatus 100 which is a voice recognition system in accordance with various embodiments. The apparatus 100 may be incorporated into and used in various battery-powered electronic devices that employ voice-recognition. That is, the apparatus 100 may be used in any of various mobile devices such as, but not limited to, a mobile telephone, smart phone, camera, video camera, tablet, laptop, audio recorder or some other battery-powered electronic device, etc.

It is to be understood that the FIG. 1 schematic block diagram is limited, for the purpose of clarity, to showing only those components useful to describe the features and advantages of the various embodiments, and to describe how to make and use the various embodiments to those of ordinary skill. It is therefore to be understood that various other components, circuitry, and devices etc. may be present in order to implement an apparatus and that those various other components, circuitry, devices, etc., are understood to be present by those of ordinary skill. For example, the apparatus may include inputs for receiving power from a power source and a power bus that may be connected to a battery housed within one of the various battery powered electronic devices such as mobile devices, etc. to provide power to the apparatus 100 or to distribute power to the various components of the apparatus 100.

Another example is that the apparatus 100 may also include an internal communication bus, for providing operative coupling between the various components, circuitry, and devices. The terminology "operatively coupled" as used herein refers to coupling that enables operational and/or functional communication and relationships between the various components, circuitry, devices etc. described as being operatively coupled and may include any intervening items (i.e. buses, connectors, other components, circuitry, devices etc.) used to enable such communication such as, for example, internal communication buses such as data communication buses or any other intervening items that one of ordinary skill would understand to be present. Also, it is to be understood that other intervening items may be present between "operatively coupled" items even though such other intervening items are not necessary to the functional communication facilitated by the operative coupling. For example, a data communication bus may be present in various embodiments and may provide data to several items along a pathway along which two or more items are operatively coupled, etc. Such operative coupling is shown generally in FIG. 1 described herein.

In FIG. 1 the apparatus 100 may include a group of microphones 110 that provide microphone outputs and that are operatively coupled to microphone configuration logic 120. Although the example of FIG. 1 shows three microphones, the embodiments are not limited to three microphones and any number of microphones may be used in the embodiments. It is to be understood that the group of microphones 110 are shown using a dotted line in FIG. 1 because the group of microphones 110 is not necessarily a part of the apparatus 100. In other words, the group of microphones 110 may be part of a mobile device or some other device into which the apparatus 100 is incorporated. In that case, the apparatus 100 is operatively coupled to the group of microphones 110, which are located within the mobile device, via a suitable communication bus or suitable connectors, etc., such that the group of microphones 110 are operatively coupled to the microphone configuration logic 120.

The microphone configuration logic 120 may include various front end processing, such as, but not limited to, signal amplification, analog-to-digital conversion/digital audio sampling, echo cancellation, etc., which may be applied to the microphone M1, M2, M3 outputs prior to performing additional, less power efficient signal processing such as noise suppression. The microphone configuration logic 120 may also include switch logic operatively coupled to the group of microphones 110 and operative to respond to control signals to turn each of microphones M1, M2 or M3 on or off so as to save power consumption by not using the front end processing of the microphone configuration logic 120 for those microphones that are turned off. Additionally, in some embodiments, the microphone configuration logic 120 may be operative to receive control signals from other components of the apparatus 100 to adjust front end processing parameters such as, for example, amplifier gain.

The microphone configuration logic 120 is operatively coupled to a history buffer 130, to provide the three microphone outputs M1, M2 and M3 to the history buffer 130. Microphone configuration logic 120 is also operatively coupled to an energy estimator 140 and provides a single microphone output M3 to the energy estimator 140. The energy estimator 140 is operatively coupled to the history buffer 130 and to a voice activity detector 150. The energy estimator 140 provides a control signal 115 to the history buffer 130, a control signal 117 to the voice activity detector 150 and a control signal 121 to the microphone configuration logic 120.

The voice activity detector 150 is also operatively coupled to the microphone configuration logic 120 to receive the microphone M3 output and to provide a control signal 123 to microphone configuration logic 120. The voice activity detector 150 is further operatively coupled to a signal-to-noise ratio (SNR) estimator 160 and provides a control signal 119. The signal-to-noise ratio (SNR) estimator 160 is operatively coupled to the history buffer 130, a noise type classifier 170, a noise suppressor algorithms selector 180, and a switch 195. In the various embodiments, the various signal processing components such as the voice activity detector 150, SNR estimator 160, noise type classifier 170, noise suppressor algorithms selector 180 and noise suppressor 190 are kept in a deactivated state until needed and are progressively activated according to various decisions which may also be made progressively. Likewise, activated signal components are progressively deactivated when no longer needed in accordance with the embodiments.

The SNR estimator 160 receives a buffered voice signal 113 from the history buffer 130 and provides control signal 127 to the switch 195, control signal 129 to noise type classifier 170, and control signal 135 to the noise suppressor algorithms selector 180. The noise type classifier 170 is operatively coupled to the history buffer 130, the SNR estimator 160 and the noise suppressor algorithms selector 180.

The noise type classifier 170 receives a buffered voice signal 111 from the history buffer 130 and provides a control signal 131 to the noise suppressor algorithms selector 180. The noise suppressor algorithms selector 180 is operatively coupled to the SNR estimator 160, the noise type classifier 170, the microphone configuration logic 120, a noise suppressor 190 and system memory 107. The noise suppressor algorithms selector 180 provides a control signal 125 to the microphone configuration logic 120 and a control signal 137 to a noise suppressor 190. The noise suppressor algorithms selector 180 is also operatively coupled to system memory 107 by a read-write connection 139.

The noise suppressor 190 receives the buffered voice signal 111 from the history buffer 130 and provides a noise suppressed voice signal 133 to the switch 195. The noise suppressor 190 may also be operatively coupled to system memory 107 by a read-write connection 143 in some embodiments. The switch 195 is operatively coupled to the noise suppressor 190 and to automatic gain control (AGC) 105, and provides voice signal 141 to the AGC 105. Voice command recognition logic 101 is operatively coupled to AGC 105 and to the system control 103, which may be any type of voice controllable system control depending on the mobile device such as, but not limited to, a voice controlled dialer of a mobile telephone, a video recorder system control, an application control of a mobile telephone, smartphone, tablet, laptop, etc., or any other type of voice controllable system control. The AGC 105 adjusts the voice signal 141 received from the switch 195 and provides a gain adjusted voice signal 145 to the voice command recognition logic 101. The voice command recognition logic 101 sends a control signal 147 to the system control 103 in response to detected command words or command phrases received on the voice signal 145. In some embodiments, a transceiver 197 may also be present and may be operatively coupled to receive either the gain adjusted voice signal 145 as shown, or to receive the voice signal 141. The transceiver 197 may be a wireless transceiver for wireless communication using any wireless technology and may utilize the received voice signal as an uplink (i.e. send) transmission portion of a wireless duplex communication channel in embodiments where the apparatus 100 is used in a mobile telephone or smartphone, or etc. In alternative embodiments, either the gain adjusted voice signal 145 or the voice signal 141 may also be provided to a transceiver external to the apparatus 100 using appropriate connectivity between the apparatus 100 and a device into which the apparatus 100 is incorporated. In some embodiments, the transceiver 197 may be used to transmit voice commands to a remote voice command recognition system.

The system memory 107 is a non-volatile, non-transitory memory, and may be accessible by other components of the apparatus 100 for various settings, stored applications, etc. In some embodiments system memory 107 may store a database of noise suppression algorithms 109, which may be accessed by noise suppressor algorithms selector 180, over read-write connection 139. In some embodiments, the noise suppressor 190 access system memory 107 over read-write connection 143 and may retrieve selected noise suppression algorithms from the database of noise suppression algorithms 109 for execution.

The switch 195 is operative to respond to the control signal 127 from the SNR estimator 160, to switch its output voice signal 141 between the buffered voice signal 111 and the noise suppressor 190 noise suppressed voice signal 133. In other words, switch 195 operates as a changeover switch. The output voice signal 141 from switch 195 is provided to the AGC 105.

The disclosed embodiments employ voice activity detector 150 to distinguish voice activity from noise and accordingly enable the voice command recognition logic 101 and noise reduction as needed to improve voice recognition performance. The embodiments also utilize a low power noise estimator, SNR estimator 160, to determine when to enable or disable noise reduction thereby saving battery power. For example, under low noise conditions, the noise reduction can be disabled accordingly. Also, some microphones may be turned off during low noise conditions which also conserves battery power.

Various actions may be triggered or invoked in the embodiments based on voice activity or other criteria that progressively ramp up the application of signal processing requiring increased power consumption. For example, the voice activity detector 150 may trigger operation of noise suppressor 190 or may send control signal 123 to the microphone configuration logic 120 to increase front end processing gain, rather than invoke the noise suppressor 190, initially for low noise conditions.

For a high noise environment, dual-microphone noise reduction may be enabled. For low noise environments, a single microphone may be used, and the energy estimator 140 may create a long term energy base line from which rapid deviations will trigger the noise suppressor 190 and voice activity detector (VAD) 150 to analyze the voice signal and to decide when noise reduction should be applied. For example, an absolute ambient noise measurement may be used to decide if noise reduction should be applied and, if so, the type of noise reduction best suited for the condition. That is, because the noise suppressor algorithms selected will impact power consumption, selectively running or not running certain noise suppressor algorithms serves to minimize battery power consumption.

Thus, the energy estimator 140 is operative to detect deviations from a baseline that may be an indicator of voice being present in a received audio signal, received, for example, from microphone M3. If such deviations are detected, the energy estimator 140 may send control signal 117 to activate VAD 150 to determine if voice is actually present in the received audio signal.

Figure 2:
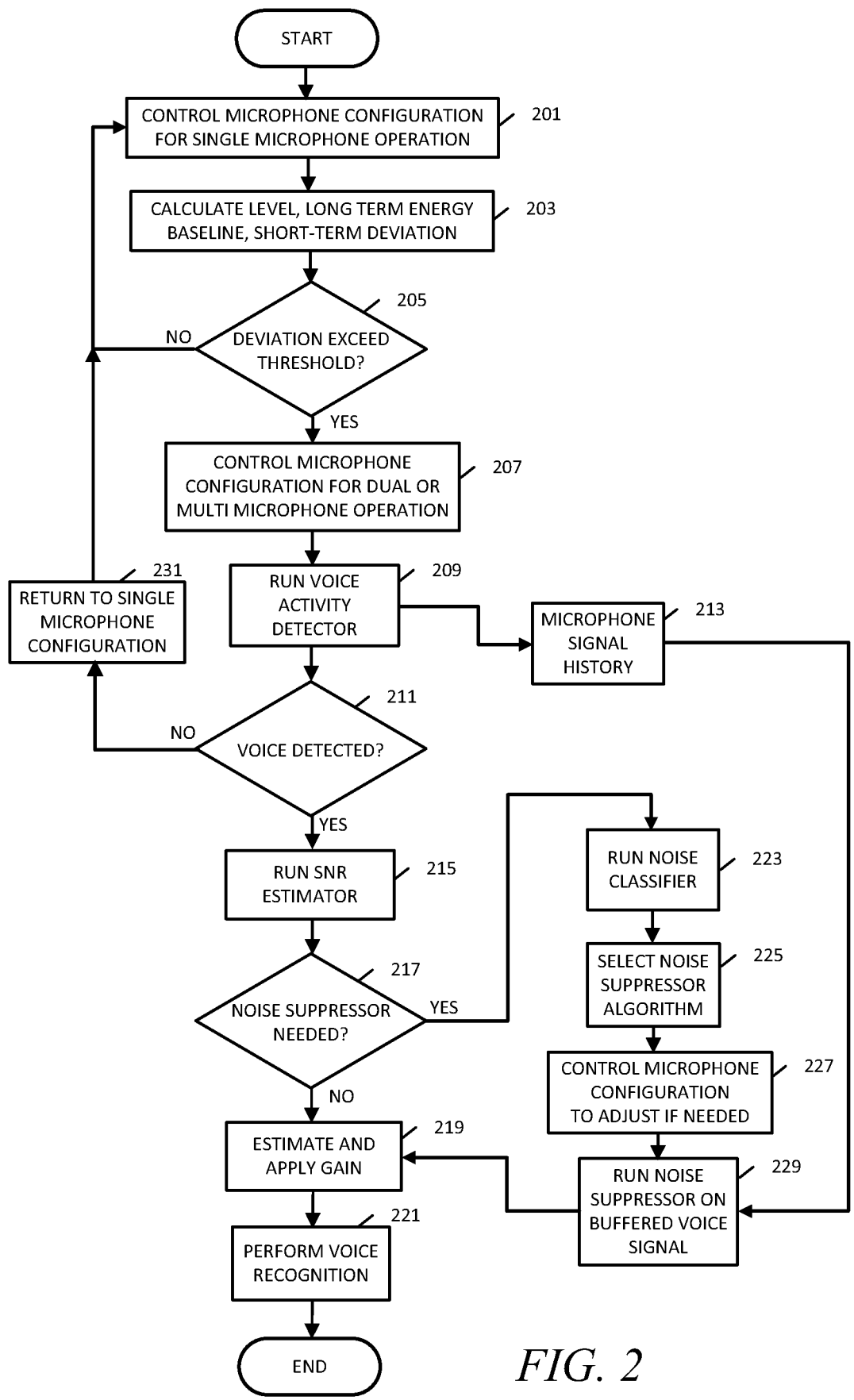
FIG. 2 is a flow chart providing an example method of operation of the apparatus of FIG. 1 in accordance with various embodiments.

An example method of operation of the apparatus 100 may be understood in view of the flowchart of FIG. 2. The method of operation begins in operation block 201 which represents a default state in which the microphone configuration logic 120 is controlled to use a single microphone configuration in order to conserve battery power. Any front end processing of the microphone configuration logic 120 for other microphones of the group of microphones 110 is therefore turned off. In operation block 203 the energy estimator 140 determines an energy baseline. The energy estimator 140 first calculates the signal level and long term power estimates, and short-term deviation from the long-term baseline. Short-term deviations exceeding a threshold invoke powering multiple microphones and buffering the signals.

Specifically, in decision block 205, the energy estimator 140 monitors the audio output from one microphone such as microphone M3 and looks for changes in the audio signal energy level. If an observed short-term deviation exceeds the threshold in decision block 205, the energy estimator 140 sends control signal 121 to the microphone configuration logic 120 to turn on at least one additional microphone as shown in operation block 207. In operation block 213, the energy estimator 140 also sends control signal 115 to history buffer 130 to invoke buffering of audio signals from the activated microphones since the buffered audio may need to have noise suppression applied in operation block 229. Also, in operation block 209, energy estimator 140 sends control signal 117 to VAD 150 to activate VAD 150 to determine if speech is present in the M3 audio signal. If the observed short-term deviation observed by the energy estimator 140 does not exceed the threshold in decision block 205, the energy estimator 140 continues to monitor the single microphone as in operation block 201. In other words, the energy estimator 140 operates to monitor an audio signal from at least one of the microphones while other signal processing components remain deactivated. A deactivated signal processing component is one that is powered down or placed in a low power mode such as a sleep state where the signal processing component operates with either no power consumption or with reduced power consumption. The signal processing component is therefore activated when it is either powered up or is awaken from a low power mode such as a sleep state.

In decision block 211, if the VAD 150 does not detect speech, the VAD 150 sends control signal 123 to the microphone configuration logic 120 and returns the system to a lower power state. For example, in operation block 231, the control signal 123 may turn off any additional microphones so that only a single microphone is used. If voice (i.e. speech activity) is detected in decision block 211, then VAD 150 sends control signal 119 to activate SNR estimator 160. In operation block 215, the SNR estimator 160 proceeds to estimate short-term signal-to-noise ratio and signal levels in order to determine if de-noising is needed.

If noise reduction is not needed in decision block 217, the SNR estimator 160 may send control signal 127 to the switch 195 to maintain the apparatus 100 in a low power state, i.e. bypassing and not using the noise suppressor 190. The apparatus 100 may also be returned to a single microphone mode of operation. For example, the noise suppressor algorithms selector 180 may send control signal 125 to the microphone configuration logic 120 to switch off any additional microphones. In operation block 219, the voice signal 141 is provided to the AGC 105 and is gained up to obtain the level required and the gain adjusted voice signal 145 is sent to the voice command recognition logic 101. In operation block 221, the voice command recognition logic 101 and, if command words or command phrases are detected, may send control signal 147 to the system control 103. The method of operation then ends. If noise reduction is determined to be necessary by the SNR estimator 160 in decision block 217, then the SNR estimator 160 sends control signal 129 to activate noise type classifier 170 as shown in operation block 223.

In operation block 223, the noise type classifier 170 receives the buffered voice signal 111, and may also receive signal-to-noise ratio information from SNR estimator 160 via control signal 129. The noise type classifier 170 assigns a noise type and sends the noise type information by control signal 131 to noise suppressor algorithms selector 180. The noise suppressor algorithms selector 180 may also receive information from SNR estimator 160 via control signal 135. In operation block 225, the noise suppressor algorithms selector 180 proceeds to select an appropriate noise suppressor algorithm for the observed conditions (i.e. observed SNR and noise type). This may be accomplished, in some embodiments, by accessing system memory 107 over read-write connection 139. The system memory 107 may store the database of noise suppression algorithms 109 and any other useful information such as an associated memory table that can be used to compare observed SNR and noise types to select a suitable noise suppression algorithm. The noise suppressor algorithms selector 180 may then send control signal 137 to activate noise suppressor 190 and to provide a pointer to the location in system memory 107 of the selected noise suppression algorithm. In operation block 227, the noise suppressor algorithms selector 180 may also send control signal 125 to the microphone configuration logic to make any adjustments that might be needed in relation to the selected noise suppressor algorithm.

In operation block 229, the noise suppressor 190 may access system memory 107 and the database of noise suppression algorithms 109 over read-write connection 143 to access the selected noise suppression algorithm and execute it accordingly. The SNR estimator 160 will also send control signal 127 to switch 195 to switch to receive the noise suppressed voice signal 133 output from noise suppressor 190, rather than the buffered voice signal 111. Instead, the noise suppressor 190 receives the buffered voice signal 111, applies the selected noise suppression algorithm and provides the noise suppressed voice signal 133 to switch 195. The method of operation then again proceeds to operation block 219 where the voice signal 141 is provided to the AGC 105 and is gained up to obtain the level required and the gain adjusted voice signal 145 is sent to the voice command recognition logic 101. In operation block 221, the voice command recognition logic 101 operates on the gain adjusted voice signal 145 and the method of operation ends as shown. The apparatus 100 may then return to single microphone operation and the method of operation beginning at operation block 201 may continue.

Initially, in the embodiments, a noise suppressor algorithm is invoked based on the attempt to determine the type of noise present in the environment, based on the noise type, and signal to noise ratio. As the noise conditions worsen, different noise algorithms can be used, with progressively increased complexity and power consumption cost. As discussed above with respect to decision block 211, the system returns to low power state after a negative VAD 150 decision or, in some embodiments after some time-out period.

In another embodiment, the apparatus 100 may run a continuous single microphone powered, long-term noise estimator/classifier which can store a set of noise estimates to be used by the noise reduction system to aid speed up convergence. In yet another embodiment, a continuously run VAD may be employed to look for speech activity. In both embodiments, the apparatus will remain in an elevated power state returning from voice recognition invocation into VAD estimation.

It is to be understood that the various components, circuitry, devices etc. described with respect to FIG. 1 including, but not limited to, those described using the term "logic," such as the microphone configuration logic 120, history buffer 130, energy estimator 140, VAD 150, SNR estimator 160, noise type classifier 170, noise suppressor algorithms selector 180, noise suppressor 190, switch 195, AGC 105, voice command recognition logic 101, or system control 103 may be implemented in various ways such as by software and/or firmware executing on one or more programmable processors such as a central processing unit (CPU) or the like, or by ASICs, DSPs, FPGAs, hardwired circuitry (logic circuitry), or any combinations thereof.

Also, it is to be understood that the various "control signals" described herein with respect to FIG. 1 and the various aforementioned components, may be implemented in various ways such as using application programming interfaces (APIs) between the various components. Therefore, in some embodiments, components may be operatively coupled using APIs rather than a hardware communication bus if such components are implemented as by software and/or firmware executing on one or more programmable processors. For example, the noise suppressor algorithms selector 180 and the noise suppressor 190 may be software and/or firmware executing on a single processor and may communicate and interact with each other using APIs.

Additionally, operations involving the system memory 107 may be implemented using pointers where the components such as, but not limited to, the noise suppressor algorithms selector 180 or the noise suppressor 190, access the system memory 107 as directed by control signals which may include pointers to memory locations or database access commands that access the database of noise suppression algorithms 109. In other words, such operations may be accomplished in the various embodiments using application programming interfaces (APIs).

Figure 3:
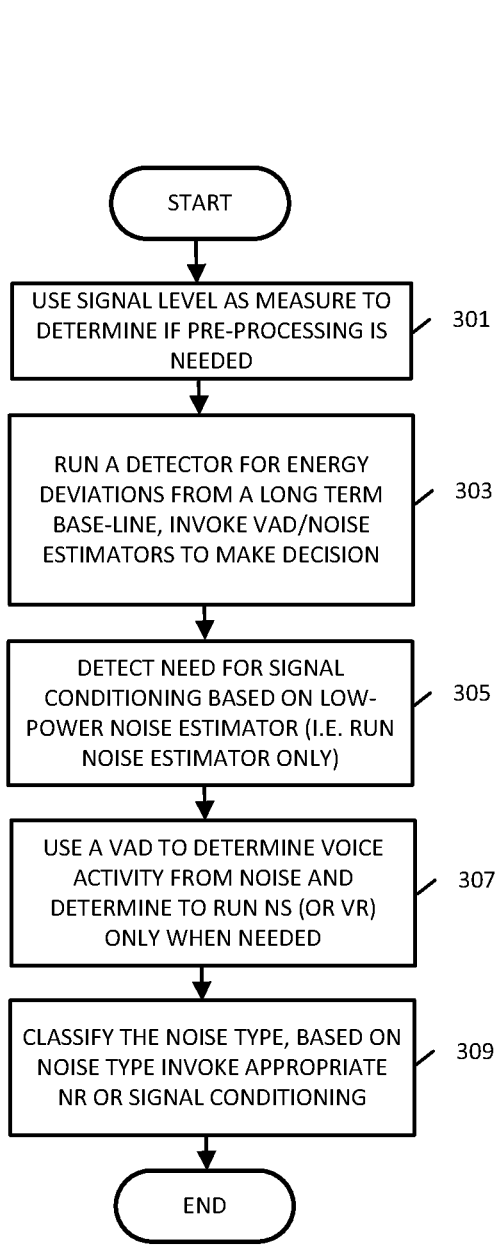
FIG. 3 is a flow chart showing a method of operation related to voice signal detection in accordance with various embodiments.
Figure 4:
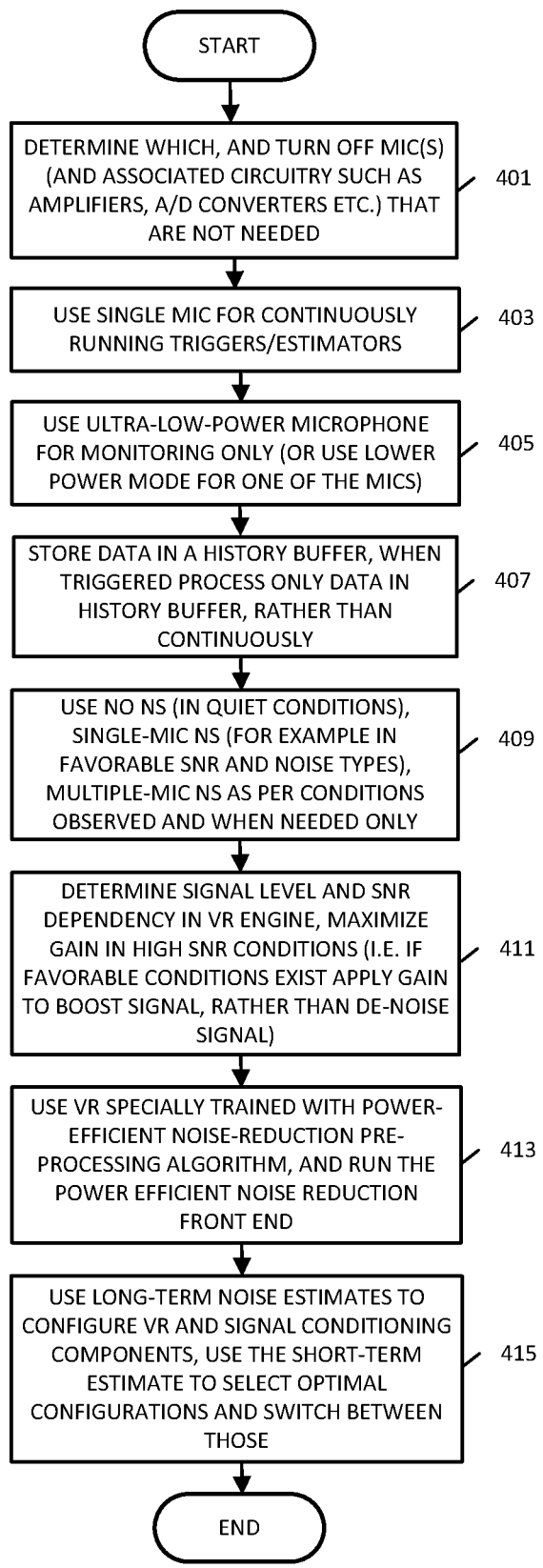
FIG. 4 is a flow chart showing a method of operation related to selection of signal processing in accordance with various embodiments.

Further methods of operation of various embodiments are illustrated by the flowcharts of FIG. 3 and FIG. 4. FIG. 3 is a flow chart showing a method of operation related to voice signal detection in accordance with various embodiments. In operation block 301, an apparatus uses a microphone signal level as a measure to determine if pre-processing is needed. In operation block 303, the apparatus runs a detector for energy deviations from a long term base-line and invokes VAD/noise estimators to make decisions as to when voice recognition logic should operate. In operation block 305, the apparatus detects the need for signal conditioning based on a low-power noise estimator (i.e. by running the noise estimator only). In operation block 307, the apparatus uses a VAD to determine voice activity from noise and to determine to whether or not to run noise suppression, or voice recognition, and runs one or the other only when needed. In operation block 309, the apparatus will classify the noise type, and based on noise type, will invoke appropriate noise suppression or other appropriate signal conditioning.

FIG. 4 is a flow chart showing a method of operation related to selection of signal processing in accordance with various embodiments. In operation block 401, the apparatus determines which microphones are not needed (as well as any associated circuitry such as amplifiers, A/D converters etc.) and turns off the microphones (and any associated circuitry) accordingly. In operation block 403, the apparatus uses a single microphone for continuously running triggers/estimators. In operation block 405, the apparatus uses an ultra-low-power microphone for monitoring only (or uses lower power mode for one of the microphones). In operation block 407, the apparatus stores data in a history buffer, and when triggered processes only data in the history buffer, rather than continuously. That is, the history buffer maintains an audio signal of interest while decisions are made as to whether voice is present in the audio signal and, subsequently, whether further signal processing components should be invoked such as noise suppression. If further signal processing components such as the noise suppressor are not required, the buffered audio signal may be sent directly to the voice command recognition logic 101. In operation block 409, the apparatus uses no noise suppression (in quiet conditions), single-microphone noise suppression (for example in favorable SNR and noise types), multiple-microphone noise suppression as per conditions observed and when needed only. In operation block 411, the apparatus determines signal level and SNR dependency, maximizes gain in high SNR conditions (i.e. if favorable conditions exist apply gain to boost signal, rather than de-noise signal). In operation block 413, the apparatus uses voice recognition specially trained with power-efficient noise-reduction pre-processing algorithm, and runs the power efficient noise reduction front end on the portable (i.e. a mobile device in which the apparatus is incorporated). In operation block 415, the apparatus uses long-term noise estimates to configure apparatus components such as voice recognition and signal conditioning components, and uses the short-term estimate to select optimal configurations and switch between those.

Figure 5:
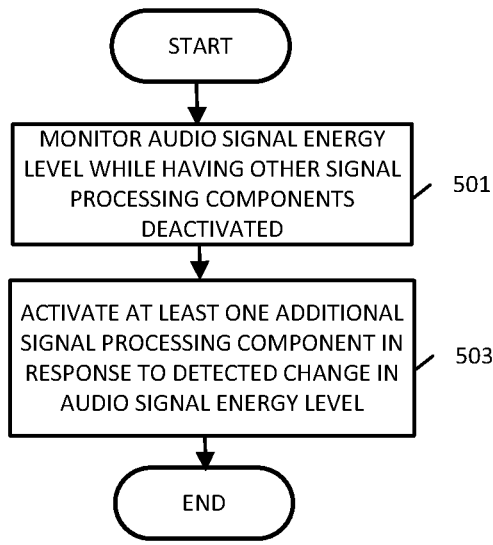
FIG. 5 is a flow chart showing a method of operation in accordance with various embodiments.
Figure 6:
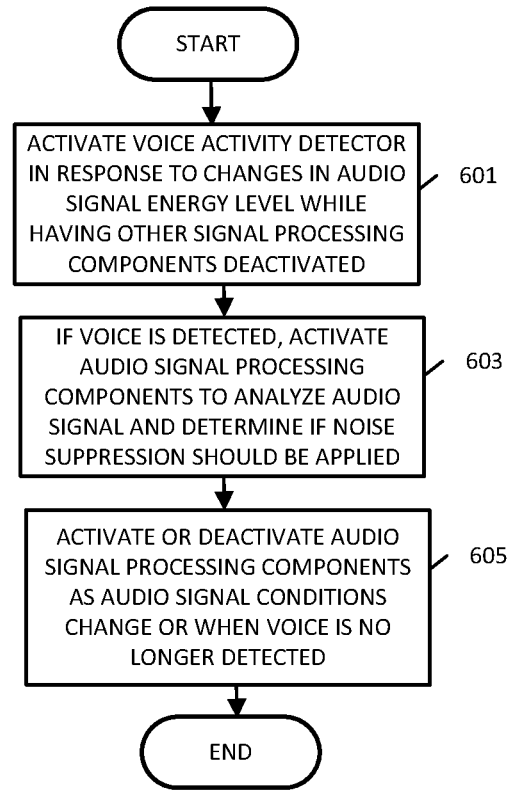
FIG. 6 is a flow chart showing a method of operation in accordance with various embodiments.

The flowcharts of FIG. 5 and FIG. 6 provide methods of operation for the various embodiments described above. In FIG. 5, operation block 501, an audio signal energy level is monitored while having other signal processing components deactivated. In operation block 503, at least one of the other signal processing components is activated in response to a detected change in the audio signal energy level. For example, if the energy level changes, this may be an indication that a device operator is speaking and attempting to command the device. In response, a VAD may be activated as the at least one other signal processing component in some embodiments. If the VAD detects the presence of voice in the audio signal, further signal processing components, such as a noise suppressor, may be activated. In another embodiment, a noise estimator may be activated initially using the assumption that voice is present in the audio signal.

The flowchart of FIG. 6 provides a method of operation where a VAD is activated in response to changes in the audio signal level as shown in operation block 601. Other signal processing components are deactivated initially. In operation block 603, if voice is detected by the VAD, other signal processing components are activated in order to analyze the audio signal and determine if noise suppression should be applied or not. Noise suppression is then either applied, or not applied, accordingly. In operation block 605, various audio signal processing components are either activated or deactivated as audio signal conditions change or when voice is no longer detected. For example, the apparatus may by returned from a multi-microphone configuration to a single, low-power microphone configuration and noise suppressors, etc. may be deactivated.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A computer-implemented method comprising:
monitoring, by an energy estimator of a powered-on computing device that includes (i) the energy estimator that is powered on, (ii) a group of microphones comprising a first microphone that is powered on and a second microphone that is powered off, (iii) a voice activity detector that is powered off, and (iv) one or more other audio signal processing components that are powered off, an audio signal energy level of an audio signal that is detected by the first microphone, for one or more deviations from a baseline audio signal energy level;
determining, by the energy estimator of the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, that the audio signal energy level of the audio signal that is detected by the first microphone has deviated from the baseline audio signal energy level by more than a threshold amount; and
based on determining that the audio signal energy level of the audio signal that is detected by the first microphone has deviated from the baseline audio signal energy level by more than the threshold amount and before performing speech recognition on the audio signal that is detected by the first microphone, triggering, by the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, the voice activity detector to power on, the second microphone to power on, and at least one of the one or more other audio signal processing components to power on.

2. The method of claim 1, further comprising performing, by the voice activity detector that is powered on, voice activity detection on the audio signal.

3. The method of claim 1, further comprising:
determining, by the voice activity detector that is powered on, that the audio signal includes voice activity; and
based on determining that the audio signal includes voice activity, performing, by the one or more other audio signal processing components that are powered on, noise estimation on the audio signal.

4. The method of claim 1, further comprising:
determining, by the one or more other audio signal processing components that are powered on, that noise suppression is required for the audio signal; and
based on determining that the noise suppression is required for the audio signal, performing, by the one or more other audio signal processing components that are powered on, noise suppression on the audio signal.

5. The method of claim 1, further comprising performing, by the one or more other audio signal processing components that are powered on, type classification on the audio signal.

6. The method of claim 1, further comprising performing, by the one or more other audio signal processing components that are powered on, speech recognition on the audio signal.

7. The method of claim 1, further comprising updating the baseline audio signal energy level after triggering the voice activity detector to power on, the second microphone to power on, and the at least one of the one or more other audio signal processing components to power on.

8. The method of claim 1, wherein the voice activity detector is implemented in software executing on one or more processors of the powered-on computing device.

9. The method of claim 1, wherein the energy estimator is implemented in software executing on one or more processors of the powered-on computing device.

10. The method of claim 1, wherein the one or more other audio signal processing components are implemented in software executing on one or more processors of the powered-on computing device.

11. The method of claim 1, wherein triggering, by the powered-on computing device that includes (i) the energy estimator that is powered on, (ii) the first microphone that is powered on and the second microphone that is powered off, (iii) the voice activity detector that is powered off, and (iv) the one or more other audio signal processing components that are powered off, the voice activity detector to power on, the second microphone to power on, and the at least one of the one or more other audio signal processing components to power on is directly based on determining that the audio signal energy level has deviated from the baseline audio signal energy level by more than the threshold amount.

12. A system comprising:
one or more computers and one or more storage devices storing instructions that are operable, when executed by the one or more computers, to cause the one or more computers to perform operations comprising:
monitoring, by an energy estimator of a powered-on computing device that includes (i) the energy estimator that is powered on, (ii) a group of microphones comprising a first microphone that is powered on and a second microphone that is powered off, (iii) a voice activity detector that is powered off, and (iv) one or more other audio signal processing components that are powered off, an audio signal energy level of an audio signal that is detected by the first microphone, for one or more deviations from a baseline audio signal energy level;
determining, by the energy estimator of the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, that the audio signal energy level of the audio signal that is detected by the first microphone has deviated from the baseline audio signal energy level by more than a threshold amount; and
based on determining that the audio signal energy level of the audio signal that is detected by the first microphone has deviated from the baseline audio signal energy level by more than the threshold amount and before performing speech recognition on the audio signal that is detected by the first microphone, triggering, by the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, the voice activity detector to power on, the second microphone to power on, and at least one of the one or more other audio signal processing components to power on.

13. The system of claim 12, wherein the operations further comprise performing, by the voice activity detector that is powered on, voice activity detection on the audio signal.

14. The system of claim 12, wherein the operations further comprise:
determining, by the voice activity detector that is powered on, that the audio signal includes voice activity; and
based on determining that the audio signal includes voice activity, performing, by the one or more other audio signal processing components that are powered on, noise estimation on the audio signal.

15. The system of claim 12, wherein the operations further comprise:
determining, by the one or more other audio signal processing components that are powered on, that noise suppression is required for the audio signal; and
based on determining that the noise suppression is required for the audio signal, performing, by the one or more other audio signal processing components that are powered on, noise suppression on the audio signal.

16. The system of claim 12, wherein the operations further comprise performing, by the one or more other audio signal processing components that are powered on, type classification on the audio signal.

17. The system of claim 12, wherein the operations further comprise performing, by the one or more other audio signal processing components that are powered on, speech recognition on the audio signal.

18. The system of claim 12, wherein the operations further comprise updating the baseline audio signal energy level after triggering the voice activity detector to power on, the second microphone to power on, and the at least one of the one or more other audio signal processing components to power on.

19. A non-transitory computer-readable medium storing software comprising instructions executable by one or more computers which, upon such execution, cause the one or more computers to perform operations comprising:
monitoring, by an energy estimator of a powered-on computing device that includes (i) the energy estimator that is powered on, (ii) a group of microphones comprising a first microphone that is powered on and a second microphone that is powered off, (iii) a voice activity detector that is powered off, and (iv) one or more other audio signal processing components that are powered off, an audio signal energy level of an audio signal that is detected by the first microphone, for one or more deviations from a baseline audio signal energy level;
determining, by the energy estimator of the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, that the audio signal energy level of the audio signal that is detected by the first microphone has deviated from the baseline audio signal energy level by more than a threshold amount; and
based on determining that the audio signal energy level of the audio signal that is detected by the first microphone has deviated from the baseline audio signal energy level by more than the threshold amount and before performing speech recognition on the audio signal that is detected by the first microphone, triggering, by the powered-on computing device that includes (i) the energy estimator that is powered on, (ii) the group of microphones comprising the first microphone that is powered on and the second microphone that is powered off, (iii) the voice activity detector that is powered off, and (iv) the one or more other audio signal processing components that are powered off, the voice activity detector to power on, the second microphone to power on, and at least one of the one or more other audio signal processing components to power on.

20. The medium of claim 19, wherein the operations further comprise performing, by the voice activity detector that is powered on, voice activity detection on the audio signal.

21. The medium of claim 19, wherein the operations further comprise:
   determining, by the voice activity detector that is powered on, that the audio signal includes voice activity; and
   based on determining that the audio signal includes voice activity, performing, by the one or more other audio signal processing components that are powered on, noise estimation on the audio signal.

22. The medium of claim 19, wherein the operations further comprise:
   determining, by the one or more other audio signal processing components that are powered on, that noise suppression is required for the audio signal; and
   based on determining that the noise suppression is required for the audio signal, performing, by the one or more other audio signal processing components that are powered on, noise suppression on the audio signal.

* * * * *